United States Patent Office 3,290,190
Patented Dec. 6, 1966

3,290,190
PLASTISOL PROPELLANT PROCESS WITH
IMPROVED DISPERSION STABILITY
John N. Godfrey, Alexandria, and Bruno J. Macri, Fairfax County, Va., assignors to Atlantic Research Corporation, Fairfax County, Va., a corporation of Virginia
No Drawing. Filed July 6, 1965, Ser. No. 469,938
15 Claims. (Cl. 149—18)

This application is a continuation-in-part of John N. Godfrey and Bruno J. Macri, S.N. 337,527, Polymer Compositions, filed January 14, 1964, now abandoned.

This invention relates to a new process for improving the dispersion stability or pot life of plastisol compositions and particularly to plastisol propellants.

Plastisol compositions are well known in the art and comprise finely-divided particles of an organic dispersion- or plastisol-grade polymer dispersed or suspended in a high-boiling, organic liquid plasticizer which dissolves the solid polymer readily only at elevated temperatures. When it is desired to form the plastisol composition into its final hardened product, it is appropriately shaped as, for example, by pouring into a mold or extruding, heated to the temperature at which the suspended polymer dissolves in the plasticizer, and subsequently cooled to form the cured rigid gel.

The plastisols are prepared by mixing the finely-divided polymer and such other solids as may be required with the liquid plasticizer until the solids are homogeneously dispersed in the liquid. Homogeneity of the plastisol is obviously essential for homogeneity of the final cured product. If the plastisol composition is used immediately, no problems with respect to homogeneity arise. However, in most cases the plastisol suspension or dispersion is not, or cannot, be used immediately. It is much more practical and economical to make large quantities of the plastisol mix and to use small increments as required.

Unfortunately, the suspended polymer and other solid particles soon begin to settle and the plastisol, even after a short period of storage, must be remixed before casting. Such settling difficulties become even more acute when other finely-divided insoluble solids such as oxidizers, metals, fillers, or pigments, are included in the plastisol composition.

Accordingly, the object of this invention is to provide a new and improved plastisol composition that remains in stable, homogeneous dispersion for greatly increased periods of time.

Another object is to provide more stable plastisols containing finely-divided, high-density, insoluble solids.

Still another object is to improve the stability of plastisols without requiring any change in composition formulation or the addition of extraneous stabilizing components.

Another object is to improve the stability of plastisol propellant slurries.

These and other objects, advantages, and features of this invention will become apparent from the following detailed description.

We have discovered that the physical stability of a plastisol slurry is greatly improved by dissolving a portion of the plastisol-forming solid polymer in a portion or all of the liquid plasticizer to form a gel of fluid to semi-solid consistency and then, with the mix at ordinary temperature, adding the remainder of the finely-divided, solid polymer, the remainder of the plasticizer, if any, and such other finely-divided, insoluble solids as may be required in the final cured product. By fluid to semi-solid gel is meant a gel that flows at ambient temperature under a finite pressure of relatively small magnitude, as for example, under a maximum shear stress at a wall of about 10 p.s.i. The increased viscosity and thixotropy imparted to the liquid plasticizer by solution therein of a portion of the plastisol-forming polymer apparently maintain the remainder of the solid polymer, as well as other solids, in homogeneous dispersion for such a long time that remixing is either eliminated entirely or is required only after unusually long storage. The stabilization obtained in this manner is particularly effective in the case of plastisol slurries containing dispersed, insoluble, high-density solids such as inert pigments or fillers, e.g. barium sulfate, calcium carbonate, calcium silicate, titanium dioxide, metal powders, and the like, and is especially advantageous in the case of propellant plastisol mixes.

This mode of improving dispersion stability can be employed with any plastisol system, many of which are well known in the art. These include polyvinyl chloride plastisols as described, for example, in "Dispersion Resin Handbook," Russell A. Park, Chemicals Division, Firestone Plastics Company, Pottstown, Pennsylvania; Lester L. Weil U.S. Pat. 2,966,403 (plastisol propellants); and Arch C. Scurlock et al., U.S. Pat. 3,107,186 (Al and Mg fuel-containing plastisol propellants); nitrocellulose plastisols as described, for example, in Lester L. Weil U.S. Pat. 2,967,098 (inert and propellant plastisols); cellulose ester, e.g. cellulose acetate, plastisols as described, for example, in Sloan et al. U.S. Pat. 2,809,120 and Sloan and Weil U.S. Pat. 2,966,405 (propellant plastisols); and cellulose ether, e.g. ethyl cellulose, plastisols as described, for example, in Arthur W. Sloan U.S. Pat. 2,814,570. The aforementioned publication and patents are hereby incorporated by reference.

Although the preliminary solution of a portion of the plastisol-forming polymer in the liquid plasticizer increases the viscosity and yield value of the final plastisol paste mix, by proper concentration selection of the portion dissolved, the mix retains adequate flow properties for pouring or pumping at ordinary temperatures under low applied pressures.

The proportion of the total plastisol-forming solid polymer selected for solution in the plasticizer is limited only to a maximum imparted viscosity such that the remaining solid polymer and other required solid additives can be incorporated by mixing without the application of heat to form a pourable or pumpable mix. Any amount of pregelled polymer that produces an appreciable increase in plasticizer viscosity is effective to improve stability. The specific amount dissolved will vary with such viscosity-affecting factors as the particular plastisol-forming polymer, the particular liquid plasticizer, and the amount, kind, and density of added dispersed solids. Obviously the optimum concentration can be readily determined by preliminary routine testing. By way of example, we have found that for a high required solids loading, as in the case of a propellant plastisol composition, a concentration of pre-dissolved polymer of about 0.3 to 10% by weight of the liquid plasticizer is generally suitable. For relatively small solids loading, the concentration could be considerably increased.

Stabilization by utilizing a portion of the plastisol-forming polymer is particularly advantageous because it eliminates the need for extraneous additives or change of composition formulation. Gelling agents, such as metallic stearates, silicones, and bentonite clays, have been introduced into plastisols in the past, primarily to produce a putty-like consistency for special molding or working properties. These gelling agents, however, have serious disadvantages for many applications because they are extraneous additives that can adversely affect the desired properties of the final cured product, such as color, transparency and other physical properties. They are particularly undesirable in the case of propellant compositions. Every component of a propellant composition affects not only physical properties but also ballistic properties. Extraneous additives such as the above introduces essentially inert materials that do not contribute ballistically, thereby reducing specific impulse and further require expensive and time-consuming propellant reformulation and ballistic testing.

Plastisol propellants pose special problems that make our new mode of stabilization particularly advantageous. Ballistic properties are critically dependent on the formulation. Seemingly slight variations change ballistic performance. Such variations can be produced even by small variations in raw materials. For this reason, as well as for reasons of cost and time saving, it is generally desirable to mix large batches to ensure the casting of uniformly reproducible cured solid propellant grains. The finished grains must be free of even slight flows to prevent failure or explosion in the rocket motor. Because of this and the explosion hazards inherent in the heat curing operation, production of the cured grain is generally on a relatively slow schedule, so that the mixed, uncured plastisol mix is often not completely consumed for periods as long as several weeks.

The plastisol propellant mix, furthermore, is highly loaded with insoluble dispersed solids such as oxidizers, e.g. ammonium perchlorate and ammonium nitrate, and powdered metal, metal hydride, and other solid fuels, e.g. Al, Be, Mg, Zr, zirconium hydride, Si, B, boron hydride, C. These dispersed solids, particularly the metals, are considerably denser than the plastisol matrix and, therefore, tend to sediment within a short time after mixing. The ballistic variations that this produces in the finished, cured grains obviously cannot be tolerated.

These factors, as well as the aforementioned undesirability of employing the extraneous gelling additives elsewhere used in the plastisol art, have hitherto made it necessary to remix the propellant plastisol slurries prior to casting even after such short periods of storage as two or three days. In the case of a propellant plastisol, such remixing adds an additional explosively hazardous step and is particularly costly in time and tying up of equipment. The equipment must be thoroughly cleaned of every trace of propellant before reuse to prevent explosions.

Processing of the plastisol mixes is simple. Solution of the desired portion of the plastisol-forming polymer is accomplished by mixing the solid polymer with the liquid plasticizer and heating to solution temperature. The solid polymer portion can be dissolved in all of the liquid plasticizer if desired. After cooling the gelled plasticizer to a temperature below the polymer solution temperature, generally to ordinary temperature, the remaining plastisol polymer and other insoluble solids can be added and dispersed in a suitable mixer. For reasons of economy, it may be preferable to dissolve the polymer portion in only a portion of the liquid plasticizer, in which case, the remaining liquid plasticizer as well as the solids are combined with the pregelled portion and mixed.

The plastisol mix is then processed in conventional fashion. It can be spread as a coating, pumped into molds, or fed into an extruder. After heating to the temperatures conventionally employed to dissolve the remaining finely-divided, dispersed polymer, the molded composition is conventionally cooled and sets into a rigid or solid gel of identical formulation and properties as the products conventionally formed without the pregelling step.

The following examples illustrates the operation of the invention.

*Example 1*

Propellant plastisol compositions were prepared having the following component formulation.

| | Percent by weight |
|---|---|
| Polyvinyl chloride (PVC) } binder | 8.44 |
| Dioctyl adipate (DOA) } | 10.22 |
| Ammonium perchlorate | 79.04 |
| Al powder | 2.00 |
| Carbon black | 0.05 |
| Wetting agent | 0.25 |

Different proportions of the polyvinyl chloride were dissolved by heating in portions of the dioctyl adipate plasticizer. The remainder of the plasticizer, polymer, and other solids were then mixed with the cooled pregelled portion of the binder in a Baker-Perkins sigma-blade mixer. The resulting paste-like mixes were tested for settling rate by centrifuging and by observation during static storage.

CLEAR LAYER HEIGHTS AFTER CENTRIFUGING

| Minutes in Centrifuge | Wt. Percent Binder as 5% PVC/DOA Gel | | | | | |
|---|---|---|---|---|---|---|
| | 0 | 10 | 15 | 20 | 25 | 30 |
| | In. | In. | In. | In. | In. | In. |
| 0 | 0 | 0 | 0 | 0 | 0 | 0 |
| 1 | 0 | 0 | 0 | 0 | 0 | 0 |
| 2 | .01 | 0 | 0 | 0 | 0 | 0 |
| 5 | .04 | .02 | 0 | 0 | 0 | 0 |
| 10 | .08 | .06 | .01 | .01 | 0 | 0 |
| 15 | .12 | .10 | .03 | .02 | 0 | 0 |
| 21 | .18 | .14 | .04 | .04 | .01 | 0 |
| 25 | | | | .06 | .04 | .01 |
| 30 | | | .06 | .04 | .01 | 0 |
| 35 | | | | | .04 | .01 |
| 40 | | | | | | 0 |

SETTLING ON STANDING

| Wt. percent binder as 5% PVC/DOA gel: | Days to obtain 0.01 in. clear layer height |
|---|---|
| 0 | <2 |
| 10 | <6 |
| 15 | <12 |
| 20 | >42 |
| 25 | >42 |
| 30 | >42 |

*Example 2*

Propellant plastisol compositions were prepared having the following component formulation.

| | Percent by weight |
|---|---|
| PVC } binder | 8.62 |
| DOA } | 10.79 |
| Ammonium perchlorate | 58.90 |
| Al powder | 21.10 |
| Stabilizing agent [1] | 0.34 |
| Wetting agent | 0.25 |

[1] Stabilizes PVC against formation of HCl.

Plastisols containing different proportions of pregelled PVC in portion of DOA were processed and tested for separation as in Example 1.

CLEAR LAYER HEIGHTS AFTER CENTRIFUGING

| Minutes in Centrifuge | Wt. Percent Binder as 4% PVC/DOA Gel | | | |
|---|---|---|---|---|
| | 0 | 10 | 20 | 30 |
| | In. | In. | In. | In. |
| 0 | 0.00 | 0.00 | 0.00 | 0.00 |
| 2 | 0.07 | 0.03 | 0.00 | 0.00 |
| 7 | 0.13 | 0.07 | 0.00 | 0.00 |
| 17 | 0.18 | 0.16 | 0.03 | 0.02 |
| 32 | 0.20 | 0.18 | 0.06 | 0.02 |

SETTLING ON STANDING

| Wt. percent binder as 4% PVC/DOA gel: | Days to obtain 0.01 in. clear layer height |
|---|---|
| 0 | <2 |
| 10 | >2<5 |
| 15 | >8<15 |
| 20 | >20<27 |
| 25 | >27<47 |
| 30 | >33<47 |

The above results clearly show the effective stabilization accomplished even by very small proportions of pregelled polymer.

Although this invention has been described with reference to illustrative embodiments thereof, it will be apparent to those skilled in the art that it may be embodied in other forms within the scope of the appended claims.

What is claimed is:

1. In a process for making a plastisol propellant composition comprising dispersing a finely-divided dispersion- or plastisol-grade organic polymer and a finely-divided, insoluble oxidizer in an organic liquid plasticizer which dissolves the polymer readily only at elevated temperature, the improvement comprising dissolving a portion of the said polymer in said plasticizer to form a gel of fluid to semisolid consistency and then admixing said oxidizer and the remainder of the polymer with said gel at a temperature below the solution temperature of the polymer in the plasticizer.

2. The process of claim 1 in which a finely-divided, insoluble solid fuel is also admixed with said gel.

3. The process of claim 2 in which the solid fuel is a metal, metal hydride, Si, B, boron hydride, or C.

4. The process of claim 3 in which the metal is Al, Be, Mg, or Zr.

5. The process of claim 1 in which the polymer is polyvinyl chloride.

6. The process of claim 2 in which the polymer is polyvinyl chloride.

7. The process of claim 3 in which the polymer is polyvinyl chloride.

8. The process of claim 1 in which said portion of said polymer is dissolved in a portion of the liquid plasticizer to form a gel and the remainder of the liquid plasticizer is then admixed with said gel.

9. The process of claim 3 in which said portion of said polymer is dissolved in a portion of the liquid plasticizer to form a gel and the remainder of the liquid plasticizer is then admixed with said gel.

10. The process of claim 7 in which said portion of said polymer is dissolved in a portion of the liquid plasticizer to form a gel and the remainder of the liquid plasticizer is then admixed with said gel.

11. The process of claim 7 in which the oxidizer is ammonium perchlorate and the solid fuel is aluminum.

12. The process of claim 10 in which the oxidizer is ammonium perchlorate and the solid fuel is aluminum.

13. The process of claim 7 in which the oxidizer is ammonium perchlorate and the solid fuel is beryllium.

14. The process of claim 10 in which the oxidizer is ammonium perchlorate and the solid fuel is beryllium.

15. The process of claim 3 in which the polymer is nitrocellulose.

References Cited by the Examiner
UNITED STATES PATENTS

| 2,711,997 | 6/1955 | Trieschmann et al. | 260—29.1 |
| 2,800,463 | 7/1957 | Morrison | 260—29.1 |
| 2,966,403 | 12/1960 | Weil | 149—19 |
| 3,107,186 | 10/1963 | Scurlock et al. | 149—19 |

BENJAMIN R. PADGETT, *Primary Examiner.*

LEON D. ROSDOL, *Examiner.*

UNITED STATES PATENT OFFICE
CERTIFICATE OF CORRECTION

Patent No. 3,290,190            December 6, 1966

John N. Godfrey et al.

It is hereby certified that error appears in the above numbered patent requiring correction and that the said Letters Patent should read as corrected below.

Column 1, line 11, for "S.N. 337,527" read -- S.N. 337,524 --.

Signed and sealed this 26th day of September 1967.

(SEAL)
Attest:

ERNEST W. SWIDER            EDWARD J. BRENNER
Attesting Officer            Commissioner of Patents